US009344605B2

(12) United States Patent
Li et al.

(10) Patent No.: US 9,344,605 B2
(45) Date of Patent: May 17, 2016

(54) METHOD AND SYSTEM FOR CLOSED-LOOP COLOR CORRECTION BASED ON A MULTIDIMENSIONAL TABLE

(71) Applicants: Peking University Founder Group Co., Ltd., Beijing (CN); Beijing Founder Electronics Co., Ltd., Beijing (CN)

(72) Inventors: Haifeng Li, Beijing (CN); Yanman Ma, Beijing (CN)

(73) Assignees: PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/652,988

(22) PCT Filed: Dec. 4, 2013

(86) PCT No.: PCT/CN2013/088486
§ 371 (c)(1),
(2) Date: Jun. 17, 2015

(87) PCT Pub. No.: WO2014/094541
PCT Pub. Date: Jun. 26, 2014

(65) Prior Publication Data
US 2015/0341527 A1 Nov. 26, 2015

(30) Foreign Application Priority Data

Dec. 17, 2012 (CN) .......................... 2012 1 0547841

(51) Int. Cl.
*G06F 15/00* (2006.01)
*H04N 1/60* (2006.01)
*G06F 3/12* (2006.01)

(52) U.S. Cl.
CPC .. *H04N 1/60* (2013.01); *G06F 3/12* (2013.01); *G06F 3/1208* (2013.01); *G06F 3/1244* (2013.01)

(58) Field of Classification Search
None
See application file for complete search history.

(56) References Cited

U.S. PATENT DOCUMENTS

| 7,656,554 B2 * | 2/2010 | Deer | H04N 1/56 345/591 |
| 8,035,654 B1 * | 10/2011 | Borg | H04N 1/6019 345/589 |
| 8,810,675 B2 * | 8/2014 | Sasaki | H04N 1/409 348/222.1 |
| 2012/0133962 A1 | 5/2012 | Kondo | |

FOREIGN PATENT DOCUMENTS

| CN | 1992779 A | 7/2007 |
| CN | 102082893 A | 6/2011 |
| CN | 102082894 A | 6/2011 |

* cited by examiner

*Primary Examiner* — Steven Kau
(74) *Attorney, Agent, or Firm* — Brinks Gilson & Lione

(57) ABSTRACT

The present invention relates to a method and system for closed-loop color correction based on a multidimensional table, and belongs to printing device correction methods in the field of image hardcopy. The method comprises a step of performing loop color correction for color conversion based on a multidimensional look-up table, wherein a mapping relationship is established between a set of input dots and a set of output dots using a multidimensional look-up table in the color conversion. With the method and system of this invention, for different combinations of papers, printing inks and devices, a color conversion may be corrected to a more accurate extent, getting a chromatic aberration and a visual appearance closer to that of a target color, so as to achieve the purpose of color consistency management.

8 Claims, 4 Drawing Sheets

METHOD AND SYSTEM FOR CLOSED-LOOP COLOR CORRECTION BASED ON A MULTIDIMENSIONAL TABLE

CROSS-REFERENCE TO RELATED APPLICATIONS

The present application is a §371 national stage application of PCT International Application No. PCT/CN2013/088486, filed Dec. 4, 2013, which application claims a right of priority to Chinese Patent Application No. 201210547841.5, filed Dec. 17, 2012, both of which are incorporated herein by reference in their entirety.

TECHNICAL FIELD

This invention relates to a calibration method for a printing device in the field of image hardcopy, and more particularly, to a method and system for closed-loop color correction based on a multidimensional table.

DESCRIPTION OF THE RELATED ART

With the development of digital proofing and digital printing technologies, color management become more and more important in printing production. The core for quality control of a printed work lies in color. Color management is playing a central role in the entire production management of printing enterprises. More and more printing enterprises begin to introduce and carry out printing color management, with the expectation of forming a more efficient printing production system by the printing color management cooperating with the new techniques for modern printing, and thus improving print quality and enterprise competitiveness.

Color management generally comprises three steps: device calibration, device characterization and color conversion. Device calibration refers to correcting various devices in printing production flow and the standardization of process parameters so as to reach a stable operation state. Device characterization refers to, on the premise that the devices have been calibrated, measuring color data using various software or hardware tools, producing color characteristic files for the devices, and recording color domain features of the devices. In the third step, device-depended color space (CMYK, RGB) conversions are performed by a color management module taking advantage of device-independent color spaces (Lab, XYZ).

In these three steps, device calibration and device characterization are critical steps in terms of effective color management. Rather than simple correction performed on various device, device calibration is comprehensive calibration of printing production processes and procedures, including the normalization and standardization of process parameters of print production. The key of device characterization lies in obtaining high-quality color characteristic files, with focus on selecting printing samples that may reflect printing conditions correctly, adopting specialized measuring tools and specialized software for generating color characteristic representation files. In color conversion, colors are converted from one device characteristic space to another device characteristic space with a guarantee of unchanged color appearance during the conversion process, which is the essence of color conversion.

It can be seen from above, color conversion is the key to keep color consistency and is a very important step in color management. Therefore, how to carry out color conversion accurately is a problem to be solved in printing color management.

A color conversion method and system is disclosed in this invention, in which the accuracy of color conversion is corrected in a closed-loop manner using a multidimensional table. The object of the correction is to guarantee that the device characterization may more closely match the color domain of target characterization, so as to guarantee the consistency between device colors and target colors.

SUMMARY OF THE INVENTION

In view of defects existed in the prior art, an object of this invention is to provide a method and system for closed-loop color correction based on a multidimensional table. In view of the requirements in printing color management, according to a multidimensional table, closed-loop color correction is performed to guarantee that a corrected color may get closer to a simulated target color and thus achieve the final purpose of color conversion.

In order to realize the above object, a technical solution adopted in this invention is a method for closed-loop color correction based on a multidimensional table. The method comprises a step of performing loop color correction for color conversion based on a multidimensional look-up table, wherein the color conversion establishes a mapping relationship between a set of input points and a set of output points using a multidimensional look-up table, and the multidimensional look-up table is represented by the following expressions $$In = \begin{bmatrix} InP1_1 & InP2_1 & \ldots & InPi_1 & \ldots & InPn_1 \\ InP1_2 & InP2_2 & \ldots & InPi_2 & \ldots & InPn_2 \\ \vdots & \vdots & \vdots & \vdots & \vdots & \vdots \\ InP1_j & InP2_j & \ldots & InPi_j & \ldots & InPn_j \\ \vdots & \vdots & \vdots & \vdots & \vdots & \vdots \\ InP1_m & InP2_m & \ldots & InPi_m & \ldots & InPn_m \end{bmatrix}$$

$$Out = \begin{bmatrix} OutP1_1 & OutP2_1 & \ldots & OutPi_1 & \ldots & OutPt_1 \\ OutP1_2 & OutP2_2 & \ldots & OutPi_2 & \ldots & OutPt_2 \\ \vdots & \vdots & \vdots & \vdots & \vdots & \vdots \\ OutP1_j & OutP2_j & \ldots & OutPi_j & \ldots & OutPt_j \\ \vdots & \vdots & \vdots & \vdots & \vdots & \vdots \\ OutP1_m & OutP2_m & \ldots & OutPi_m & \ldots & OutPt_m \end{bmatrix}$$

wherein, In represents the input of the multidimensional table, each row of the matrix representing an input point and each column representing a color channel of an input point:

n represents the number of color channels of an input point, indicating that the multidimensional table is a n dimensional look-up table;

m represents the number of input points, indicating the number of nodes in the look-up table;

$Inpi_j$ represents the value of the j-th input point on the i-th color channel:

Out represents the output of the multidimensional table, each row of the matrix representing an output point, and each column representing a color channel of an output point: the j-th row represents output values corresponding to input points represented by the j-th row of In.

t represents the number of color channels of an output point;

$OutPi_j$ represents the value of an output corresponding to the j-th input color point on the i-th channel.

Further, the step of performing loop color correction for color conversion based on a multidimensional look-up table is as follows.

Step 1: Extract Sample Points to Form a Color Target Pattern.

Since the number of input point in a look-up table may be too large, if all dots are used during color conversion and correction, a sampling process may take a long time, with a large amount of calculation and low efficiency. Therefore, some points are extracted as sample points to form a color target pattern, and those sample points in the color target pattern are used for data collection and calculation. The color target pattern is composed of color blocks of a series of sets of input points, the color blocks represent a combination of different screen dots percentages of each color.

Colors of the color blocks in the color target pattern being represented as follows:

$$PC = \begin{bmatrix} PcP1_1 & PcP2_1 & \ldots & PcPi_1 & \ldots & PcPn_1 \\ PcP1_2 & PcP2_2 & \ldots & PcPi_2 & \ldots & PcPn_2 \\ \vdots & \vdots & \vdots & \vdots & \vdots & \vdots \\ PcP1_j & PcP2_j & \ldots & PcPi_j & \ldots & PcPn_j \\ \vdots & \vdots & \vdots & \vdots & \vdots & \vdots \\ PcP1_s & PcP2_s & \ldots & PcPi_s & \ldots & PcPn_s \end{bmatrix}$$

Wherein, PC represents a set of colors of the color blocks, each row in the matrix representing a color block in the color target pattern and each column representing a color channel of an input point;

s represents the number of color blocks in the color target pattern;

$PcPi_j$ represents a screen dot percentage of the j-th color block on the i-th color channel, each color channel having the same or a different screen dot percentage, $PcPi_j \in [0,100\%]$.

Step 2: Acquire Target Data.

using color values in the color target pattern of step 1 as an input, retrieving device-independent output data from a target characteristic look-up table as target chromatic data. The target chromatic data uses L*a*b* values specified by the International Commission on illumination.

The target data is represented in a dot matrix as follows.

$$CT = \begin{bmatrix} L^*_{ct1} & a^*_{ct1} & b^*_{ct1} \\ L^*_{ct2} & a^*_{ct2} & b^*_{ct2} \\ \vdots & \vdots & \vdots \\ L^*_{cti} & a^*_{cti} & b^*_{cti} \\ \vdots & \vdots & \vdots \\ L^*_{cts} & a^*_{cts} & b^*_{cts} \end{bmatrix}$$

Wherein, $L^*_{cti}$, $a^*_{cti}$, $b^*_{cti}$ represent target L*a*b* data of the i-th color block in the color target pattern.

correction data is represented in a matrix as follows.

$$MD = \begin{bmatrix} L^*_{md1} & a^*_{md1} & b^*_{md1} \\ L^*_{md2} & a^*_{md2} & b^*_{md2} \\ \vdots & \vdots & \vdots \\ L^*_{mdi} & a^*_{mdi} & b^*_{mdi} \\ \vdots & \vdots & \vdots \\ L^*_{mds} & a^*_{mds} & b^*_{mds} \end{bmatrix}$$

Wherein, $L^*_{mdi}$, $a^*_{mdi}$, $b^*_{mdi}$ represent corrected L*a*b* data of the i-th color block in the color target pattern.

Before the correction, the target values are used as initial values of correction data, and satisfy the following relations:

$$\begin{cases} L^*_{mdi} = L^*_{cti} \\ a^*_{mdi} = L^*_{cti} \\ b^*_{mdi} = L^*_{cti} \end{cases}, i \in [1.s]$$

Step 3: Print and Obtain Measurement Data.

the color target pattern produced in step 1 is printed, and then color blocks in the color target pattern is measured using a measurement instrument to obtain measurement data, wherein the measurement data is L*a*b* value of each color block.

Measurement data is represented in a matrix as follows.

$$CM = \begin{bmatrix} L^*_{cm1} & a^*_{cm1} & b^*_{cm1} \\ L^*_{cm2} & a^*_{cm2} & b^*_{cm2} \\ \vdots & \vdots & \vdots \\ L^*_{cmi} & a^*_{cmi} & b^*_{cmi} \\ \vdots & \vdots & \vdots \\ L^*_{cms} & a^*_{cms} & b^*_{cms} \end{bmatrix}$$

Wherein, $L_{cmi}^*$, $a_{cmi}^*$, $b_{cmi}^*$ represent measured L*a*b* data of the i-th colorful block in the color target pattern.

Step 4: Initial Correction

The degree of color difference between the measurement data and the target data is calculated, which is represented by chromatic aberration (ΔE) as specified by the International Commission on illumination. In this invention, a chromatic aberration equation, represented as equation 1, published by the International Commission on illumination in 1976 is adopted.

$$\Delta E = \sqrt{(L_1^* - L_2^*)^2 + (a_1^* - a_2^*)^2 + (b_1^* - b_2^*)^2} \qquad \text{Equation 1}$$

Wherein, $L_1^*$, $a_1^*$, $b_1^*$ represent chromatic values of a first color to be compared, and $L_2^*$, $a_2^*$, $b_2^*$ represent chromatic values of another color to be compared;

As to another point, the difference between the target data and the measurement data is calculated and the target data is corrected according to the difference. Correction equations are as follows.

$$\begin{cases} L^*_{mdi} = L^*_{mdi} + MDI_L * (L^*_{cti} - L^*_{cmi}) \\ a^*_{mdi} = a^*_{mdi} + MDI_a * (a^*_{cti} - a^*_{cmi}) \\ b^*_{mdi} = b^*_{mdi} + MDI_b * (b^*_{cti} - b^*_{cmi}) \end{cases}, i \in [1, s] \qquad \text{Equation 2}$$

wherein, $MDI_L$, $MDI_a$, $MDI_b$ are correction coefficients used for colors L*, a*, b* respectively.

Step 5: Reproducing a Color Conversion Table

1) Reproducing a Target Characteristic Look-Up Table using color values on the color target pattern of step 1 and corresponding correction data of step 4, a target characteristic look-up table is reproduced, the characteristic look-up table is also a multidimensional table and is a bidiretional mapping loop-up table. That is to say, a set of input points may be mapped to a set of output points, or the set of output points may be mapped to the set of input points.

2) Reproduce a Color Conversion Table points in the input matrix In are converted using the device characteristic look-up table, and points in the corresponding output matrix Out are retrieved using the target characteristic look-up table, the color conversion table is reproduced.

Step 6: Closed-Loop Correction

Steps 3 to 5 are repeated to perform closed-loop correction on the color conversion table, until satisfied or the occurrence of a rebound in average chromatic aberration.

During the correction, in order to keep the consistency with target colors, points having a rebounded chromatic aberration are not corrected, that is, the correction values are calculated using equation 3. For other colors, correction is performed according to the scheme of step 4.

$$\begin{cases} L^*_{mdi} = L^*_{mdi} \\ a^*_{mdi} = a^*_{mdi}, & i \in [1, s] \\ b^*_{mdi} = b^*_{mdi} \end{cases} \quad \text{Equation 3}$$

A system for closed-loop color correction based on a multidimensional table is further disclosed, comprising a module for performing loop color correction for color conversion based on a multidimensional look-up table, wherein the color conversion establishes a mapping relationship between a set of input points and a set of output points using a multidimensional look-up table, the multidimensional look-up table being represented by expressions as follows:

$$\text{In} = \begin{bmatrix} InP1_1 & InP2_1 & \cdots & InPi_1 & \cdots & InPn_1 \\ InP1_2 & InP2_2 & \cdots & InPi_2 & \cdots & InPn_2 \\ \vdots & \vdots & \vdots & \vdots & \vdots & \vdots \\ InP1_j & InP2_j & \cdots & InPi_j & \cdots & InPn_j \\ \vdots & \vdots & \vdots & \vdots & \vdots & \vdots \\ InP1_m & InP2_m & \cdots & InPi_m & \cdots & InPn_m \end{bmatrix}$$

$$\text{Out} = \begin{bmatrix} OutP1_1 & OutP2_1 & \cdots & OutPi_1 & \cdots & OutPt_1 \\ OutP1_2 & OutP2_2 & \cdots & OutPi_2 & \cdots & OutPt_2 \\ \vdots & \vdots & \vdots & \vdots & \vdots & \vdots \\ OutP1_j & OutP2_j & \cdots & OutPi_j & \cdots & OutPt_j \\ \vdots & \vdots & \vdots & \vdots & \vdots & \vdots \\ OutP1_m & OutP2_m & \cdots & OutPi_m & \cdots & OutPt_m \end{bmatrix}$$

wherein, In represents the input of the multidimensional table, each row of the matrix representing an input point and each column representing a color channel of an input point;

n represents the number of color channels of an input point, indicating that the multidimensional table is a n dimensional look-up table;

m represents the number of input points, indicating the number of nodes in the look-up table;

$Inpi_j$ represents the value of the j-th input point on the i-th color channel;

Out represents the output of the multidimensional table, each row of the matrix representing an output point, and each column representing a color channel of an output point; the j-th row represents output values corresponding to input points represented by the j-th row of In.

t represents the number of color channels of an output point;

$OutPi_j$ represents the value of an output corresponding to the j-th input color point on the i-th channel.

Further, the module for performing loop color correction for color conversion based on a multidimensional look-up table comprises:

a color target pattern generation unit for extracting sample points to form a color target pattern, the sample points on the color target pattern are used for data collection and calculation;

a target chromatic data acquisition unit for, using color values in the color target pattern of step 1 as an input, retrieving device-independent output data from a target characteristic look-up table as target chromatic data, wherein the target chromatic data uses L*a*b* values specified by the International Commission on illumination;

a measurement data acquisition unit for printing the color target pattern produced in step 1, and then measuring color blocks in the color target pattern using a measurement instrument to obtain measurement data, wherein the measurement data is L*a*b* value of each color block;

an initial correction unit for calculating a degree of color difference between the measurement data and the target data, and correcting the target data according to the difference;

a color conversion table reproduction unit for:

1) Reproducing a Target Characteristic Look-Up Table using color values on the color target pattern and corresponding correction data, a target characteristic look-up table is reproduced, the characteristic look-up table is also a multidimensional table and is a bidirectional mapping loop-up table;

2) Reproducing a Color Conversion Table points in the input matrix In are converted using the device characteristic look-up table, and points in the corresponding output matrix Out are retrieved using the target characteristic look-up table, the color conversion table is reproduced;

a closed-loop correction unit for performing closed-loop correction on the color conversion table, until satisfied or the occurrence of a rebound in average chromatic aberration.

The effect of this invention lies in that: with the method and system provided in this invention, for different combinations of papers, inks and devices, a color conversion table may be corrected to a more accurate extent, getting a chromatic aberration value and a visual appearance closer to that of a target color, so as to achieve the purpose of color consistency for the color management.

DETAILED DESCRIPTION OF THE PREFERRED EMBODIMENT

Below, this invention will be further described in detail with reference to the drawings and embodiments.

In this embodiment, the output device is an Epson Stylus Pro 7908 printer, printing inks is original inks of 8 colors from Epson, the paper is Fantac Inkjet Proofing Papers (190 g), and the measurement device is EysOne-iSis available from the X-Rite Corp.

Figure 1:
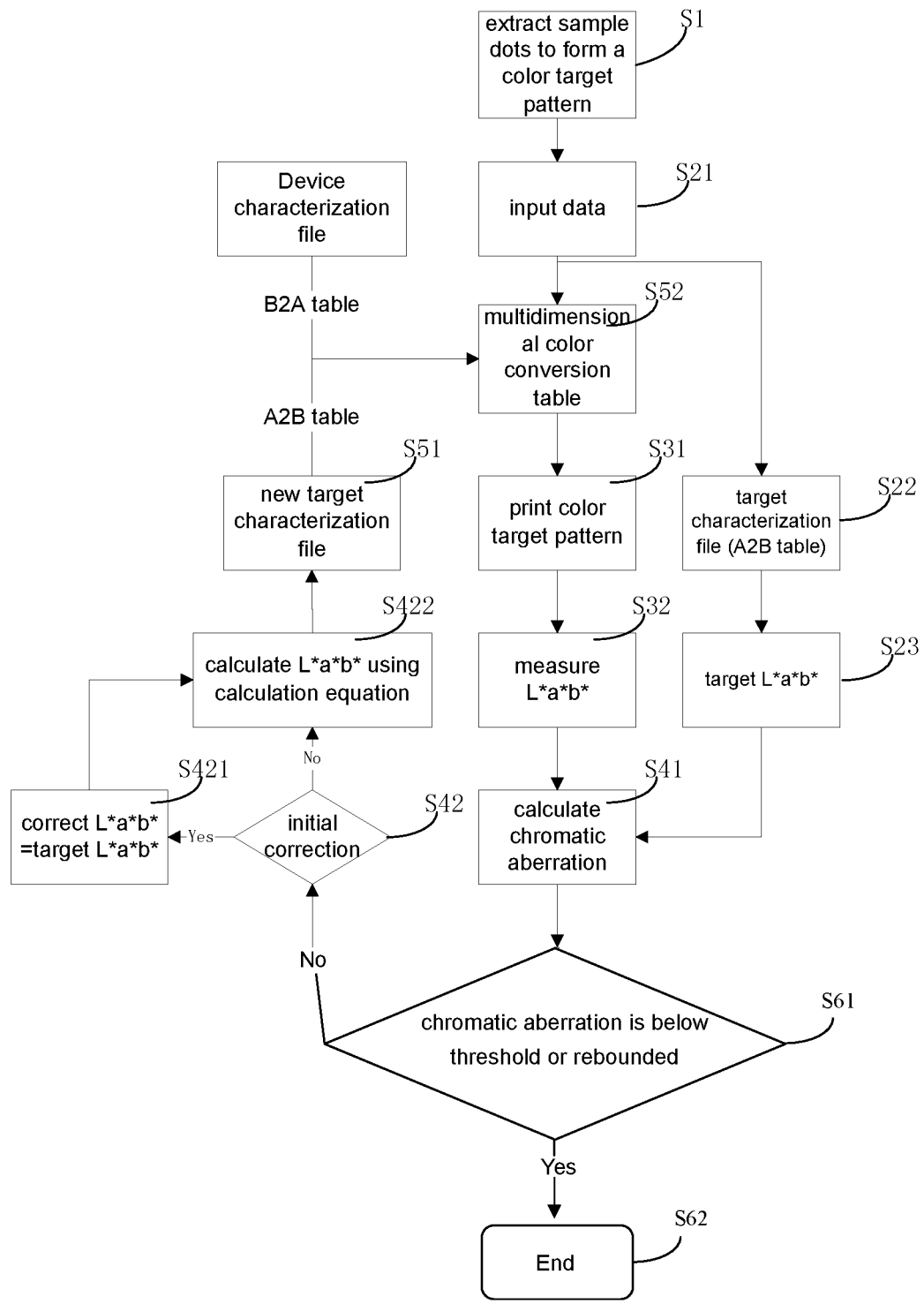
FIG. 1 is a flowchart of a multidimensional table based closed-loop color correction method according to an embodiment of this invention.

FIG. 1 shows a flowchart of a method for closed-loop correcting colors based on a multidimensional table, particularly comprising the following steps.

A four-dimensional look-up table is used as the multidimensional color conversion table in this embodiment, with CMYK colors as the input and output colors, i.e., n=t=4, and the color channels are C, M, Y, K. The number of points in the input and output matrixes is m=33*33*33*33. Each color channel of the input matrix is divided to 33 nodes in equal proportion. The data is normalized and the adopted input matrix is as follows.

$$In = \begin{bmatrix} 0 & 0 & 0 & 0 \\ 0 & 0 & 0 & \frac{1}{32} \\ \vdots & \vdots & \vdots & \vdots \\ C_j & M_j & Y_j & K_j \\ \vdots & \vdots & \vdots & \vdots \\ C_m & M_m & Y_m & K_m \end{bmatrix}$$

Wherein, $$C_{j'} M_{j'} Y_{j'} K_j \in \left[0, \frac{1}{32}, \frac{2}{32}, \frac{3}{32}, \frac{4}{32}, \cdots, \frac{32}{32}\right].$$

Step 1: Extract Sample Points to Form a Color Target Pattern.

Figure 5:
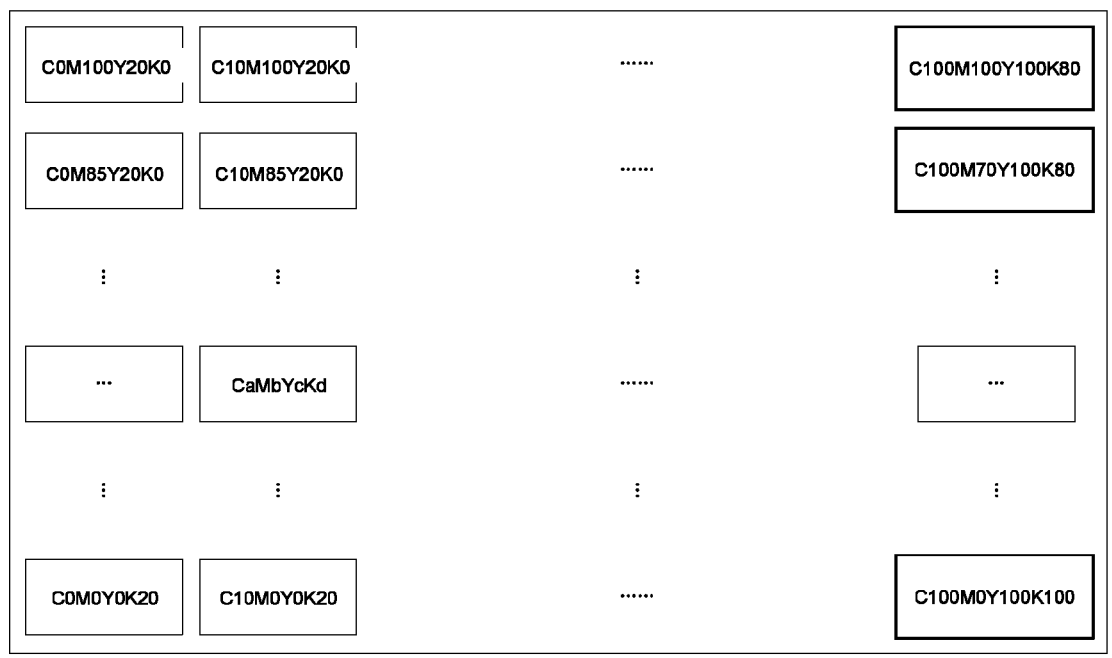
FIG. 5 is a color target pattern adopted in closed-loop correction according to an embodiment of this invention.
Figure 6:
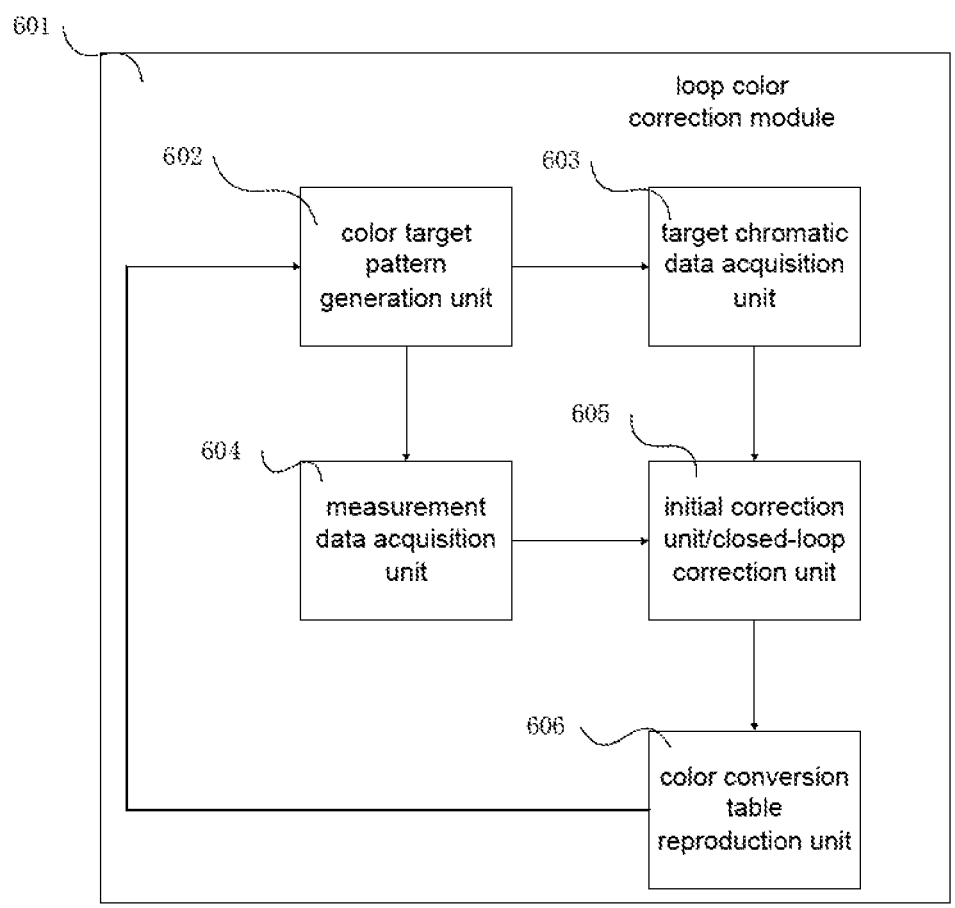
FIG. 6 is a block diagram of a loop color correction module according to an embodiment of this invention.

As shown in step S1 of FIG. 1, since the accuracy of the color conversion table is directly dependent on the selection of sample points, an ECI2002 color target pattern conforming to international standards is used in this embodiment, which has a standard specification about the colors of colorful blocks and their distribution on a color target pattern. FIG. 5 shows a schematic diagram of a color target pattern, in which the number of colors on the color target pattern is s=1485, each block in this figure representing a color block, with a color value labeled therein; for any color block, CaMbYcKd represents the color block C has a screen dot percentage of a %, M has a screen dot percentage of b %, Y has a screen dot percentage of c %, K has a screen dot percentage of d %. A set of color values of all color blocks in the color target pattern is represented by $PC_0$.

Step 2: Acquire Target Data.

As shown in steps S21-S23 of FIG. 1, with color values on the color target pattern of step 1 as an input, device-independent output data is retrieved from a target characterized file (i.e., a target characteristic look-up table, an A2B table) as target chromatic data. In this embodiment, the target characteristic look-up table is an international standard printing source CoatedFOGRA39.icc. Target L*a*b* data corresponding to colors in the color target pattern shown in FIG. 5, which is represented as $CT_0$, is obtained through searching in a forward look-up table.

Figure 2:
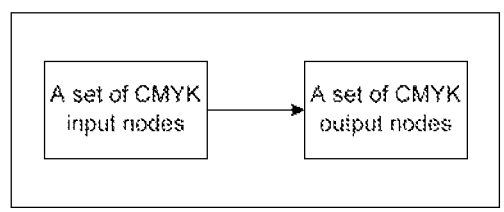
FIG. 2 is a structural diagram of a color conversion table according to an embodiment of this invention.
Figure 3:
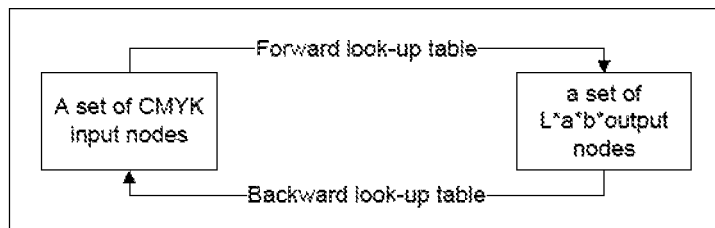
FIG. 3 is a structural diagram of a target characteristic look-up table according to an embodiment of this invention.

In this embodiment, the structure of the color conversion table is shown as FIG. 2. In the structure of the color conversion table, a mapping from a set of CMYK input nodes to a set of CMYK output nodes is formed. The structure of the target characteristic look-up table is shown in FIG. 3. The target characteristic look-up table comprises a forward look-up table and a backward look-up table. The forward look-up table shows a mapping from a set of CMYK input nodes to a set of L*a*b* output nodes, and the backward look-up table shows a mapping from the set of L*a*b* output nodes to a set of CMYK input nodes.

Step 3: Print and Obtain Measurement Data.

In steps S31-S32, the color target pattern shown in FIG. 5 is printed, and the color blocks in the color target pattern are measured using EyeOne-iSis to obtain measurement data, the measurement values being L*a*b* values of each color block which is represented as $CM_0$.

Step 4: Initial Correction.

In step S41-S42, a chromatic aberration between the measurement data and the target data is calculated using equation 1 as $\Delta E_0 = 2.31$, indicating that there is a difference between a current device's characteristic and the target characteristic. In step S421-S422, correction data is calculated using equation 2 according to the obtained target data $CT_0$ and the measurement data $CM_0$, wherein correction coefficients are $MDI_L = MDI_a = MDI_b = 1$. The data after correction is represented by $MD_0$.

Step 5: Reproduce a Color Conversion Table.

1) Reproduce a Target Characteristic Look-Up Table

In step S51, using color values $PC_0$ on the color target pattern of FIG. 5 and the calculated correction data $MD_0$, a target characteristic look-up table shown in FIG. 3 is reproduced.

2) Reproduce a Color Conversion Table

Figure 4:
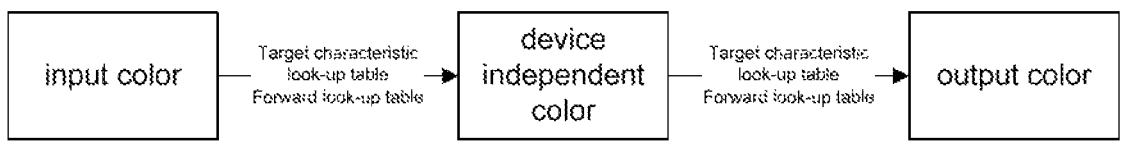
FIG. 4 is a flowchart for generating a color conversion table according to an embodiment of this invention.

In step S52, using the target characteristic look-up table and the device characteristic look-up table, according to the flow shown in FIG. 4, points in the input matrix In are converted from inputted CMYK colors to outputted CMYK colors to reproduce a color conversion table. Particularly, as shown in FIG. 4, first, inputted CMYK colors are converted to device-independent colors according to the target characteristic look-up table (i.e., the forward look-up table), and then the device-independent colors are converted to outputted CMYK colors according to the device characteristic look-up table (i.e., the backward look-up table).

Step 6: Closed-Loop Correction

In step S61, it is determined whether the chromatic aberration calculated in step S41 is below a threshold or whether a rebound in chromatic aberration occurs: if the chromatic aberration is below the threshold or a rebound occurs, the process proceeds to step S62, otherwise, steps 3 and 4 are repeated to perform a closed-loop correction for color conversion. During the correction, points having a rebound in chromatic aberration (i.e. the current chromatic aberration is larger than the previous chromatic aberration) are ignored, i.e., equation 3 is used to calculate correction values; for other colors, equation 2 is used for correction.

In step S62, chromatic aberrations in the closed-loop correction are $\Delta E_1 = 0.86$, $\Delta E_2 = 0.62$. Because a chromatic aberration of 0.62 is very low, and is below a predetermined threshold (below 1), the loop is terminated.

With the method described above, the chromatic aberration is lowered after the correction, indicating that it is closer to target characterization. The appearance of colors is consistent before and after the correction and thus the effect of this invention is achieved.

In an embodiment of this invention, a multidimensional table based closed-loop color correction system is provided, comprising a module 601 for performing loop color correction for color conversion based on a multidimensional look-up table, wherein a mapping relationship is established between a set of input points and a set of output points using a multidimensional look-up table in the color conversion. The module 601 for performing loop color correction for color conversion based on a multidimensional look-up table comprises the following units:

a color target pattern generation unit 602 for extracting sample points to form a color target pattern, and the sample points on the color target pattern are used for data collection and calculation;

a target chromatic data acquisition unit 603 for, using color values of the color target pattern of step 1 as inputs, retrieving device-independent output data from a target characteristic look-up table as target chromatic data, wherein L*a*b* values specified by the International Commission on illumination are used as the target chromatic data;

a measurement data acquisition unit 604 for printing the color target pattern produced in step 1, and then measuring color blocks in the color target pattern using a measurement instrument to obtain measurement data, wherein the measured value is L*a*b* value of each colorful block;

an initial correction unit 605 for calculating a degree of color difference between the measurement data and the target data, and correcting the target data according to the difference;

a color conversion table reproduction unit 606 for:

1) Reproducing a Target Characteristic Look-Up Table using color values on the color target pattern and corresponding correction data, a target characteristic look-up table is reproduced. The characteristic look-up table is also a multidimensional table, and is a bidirectional mapping loop-up table;

2) Reproducing a Color Conversion Table points in the input matrix In are converted using the device characteristic look-up table, and points in the corresponding output matrix Out are retrieved using the target characteristic look-up table to reproduce a color conversion table;

a closed-loop correction unit 605 for performing closed-loop correction on the color conversion table, until satisfied or the occurrence of a rebound in average chromatic aberration.

Those skilled in the art should understand that the method and system described in this invention is not limited to the embodiments described herein. The above description is merely used for the purpose of explaining this invention, and is not limitation to this invention. Other implementations that may be made by those skilled in the art according to the technical solution of this invention are also encompassed in the inventive scope of this invention, and the scope of this invention is defined by the claims and their equivalents.

The invention claimed is:

1. A method for closed-loop color correction based on a multidimensional table, characterized in that the method comprises a step of performing by a processor loop color correction for color conversion based on a multidimensional table, wherein the color conversion establishes a mapping relationship between a set of input points and a set of output points using a multidimensional table, and the multidimensional table is represented by the following expressions $$In = \begin{bmatrix} InP1_1 & InP2_1 & \ldots & InPi_1 & \ldots & InPn_1 \\ InP1_2 & InP2_2 & \ldots & InPi_2 & \ldots & InPn_2 \\ \vdots & \vdots & \vdots & \vdots & \vdots & \vdots \\ InP1_j & InP2_j & \ldots & InPi_j & \ldots & InPn_j \\ \vdots & \vdots & \vdots & \vdots & \vdots & \vdots \\ InP1_m & InP2_m & \ldots & InPi_m & \ldots & InPn_m \end{bmatrix}$$

-continued $$Out = \begin{bmatrix} OutP1_1 & OutP2_1 & \ldots & OutPi_1 & \ldots & OutPt_1 \\ OutP1_2 & OutP2_2 & \ldots & OutPi_2 & \ldots & OutPt_2 \\ \vdots & \vdots & \vdots & \vdots & \vdots & \vdots \\ OutP1_j & OutP2_j & \ldots & OutPi_j & \ldots & OutPt_j \\ \vdots & \vdots & \vdots & \vdots & \vdots & \vdots \\ OutP1_m & OutP2_m & \ldots & OutPi_m & \ldots & OutPt_m \end{bmatrix}$$

wherein, In represents the input of the multidimensional table, each row of the matrix representing an input point and each column representing a color channel of an input point;

n represents the number of color channels of an input point, indicating that the multidimensional table is a n dimensional look-up table;

m represents the number of input points, indicating the number of nodes in the look-up table;

$Inpi_j$ represents the value of the j-th input point on the i-th color channel;

Out represents the output of the multidimensional table, each row of the matrix representing an output point, and each column representing a color channel of an output point; the j-th row represents output values corresponding to input points represented by the j-th row of In;

t represents the number of color channels of an output point;

$OutPi_j$ represents the value of an output corresponding to the j-th input color point on the i-th channel; and wherein performing loop color correction for color conversion based on the multidimensional table by the processor includes:

Step 1: extracting sample points by the processor to form a color target pattern, the sample points on the color target pattern are used for data collection and calculation;

Step 2: using color values by the processor in the color target pattern of step 1 as an input, retrieving device-independent output data from a target characteristic look-up table as target chromatic data, wherein the target chromatic data uses L*a*b* values specified by the International Commission on illumination;

Step 3: printing the color target pattern produced in step 1 by a printer in communication with the processor, and then measuring color blocks in the color target pattern using a measurement instrument comprising an optical sensor to obtain measurement data, wherein the measurement data is L*a*b* value of each color block, the optical sensor being in communication with the processor;

Step 4: calculating by the processor a degree of color difference between the measurement data and the target data, and correcting the target data according to the difference;

Step 5: reproducing a color conversion table by the processor:

1) reproducing a target characteristic look-up table by the processor, wherein in using color values on the color target pattern of step 1 and corresponding correction data of step 4, a target characteristic look-up table is reproduced, and wherein the characteristic look-up table is also a multidimensional table and is a bidirectional mapping loop-up table;

2) reproducing a color conversion table by the processor, wherein points in the input matrix In are converted using the device characteristic look-up table, and points in the corresponding output matrix Out are retrieved using the target characteristic look-up table, and the color conversion table is reproduced;

Step 6: closed-loop correction by the processor, wherein steps 3 to 5 are repeated to perform closed-loop correction on the color conversion table, until satisfied or the occurrence of a rebound in average chromatic aberration.

2. The method for closed-loop color correction based on a multidimensional table according to claim 1, characterized in that, in step 1, the color target pattern is composed of color blocks of a series of sets of input points, the color blocks represent a combination of different screen dots percentages of each color, colors of the color blocks in the color target pattern being represented as follows:

$$PC = \begin{bmatrix} PcP1_1 & PcP2_1 & \ldots & PcPi_1 & \ldots & PcPn_1 \\ PcP1_2 & PcP2_2 & \ldots & PcPi_2 & \ldots & PcPn_2 \\ \vdots & \vdots & \vdots & \vdots & \vdots & \vdots \\ PcP1_j & PcP2_j & \ldots & PcPi_j & \ldots & PcPn_j \\ \vdots & \vdots & \vdots & \vdots & \vdots & \vdots \\ PcP1_s & PcP2_s & \ldots & PcPi_s & \ldots & PcPn_s \end{bmatrix}$$

wherein, PC represents a set of colors of the color blocks, each row in the matrix representing a color block in the color target pattern and each column representing a color channel of an input point;

s represents the number of color blocks in the color target pattern;

$PcPi_j$ represents a screen dot percentage of the j-th color block on the i-th color channel, each color channel having the same or a different screen dot percentage, $PcPi_j \in [0,100\%]$.

3. The method for closed-loop color correction based on a multidimensional table according to claim 1, characterized in that, in step 2, the target data is represented in a dot matrix as follows:

$$CT = \begin{bmatrix} L^*_{ct1} & a^*_{ct1} & b^*_{ct1} \\ L^*_{ct2} & a^*_{ct2} & b^*_{ct2} \\ \vdots & \vdots & \vdots \\ L^*_{cti} & a^*_{cti} & b^*_{cti} \\ \vdots & \vdots & \vdots \\ L^*_{cts} & a^*_{cts} & b^*_{cts} \end{bmatrix}$$

wherein, $L_{cti}^*$, $a_{cti}^*$, $b_{cti}^*$ represent target L*a*b* data of the i-th color block in the color target pattern;

correction data is represented in a matrix as follows:

$$MD = \begin{bmatrix} L^*_{md1} & a^*_{md1} & b^*_{md1} \\ L^*_{md2} & a^*_{md2} & b^*_{md2} \\ \vdots & \vdots & \vdots \\ L^*_{mdi} & a^*_{mdi} & b^*_{mdi} \\ \vdots & \vdots & \vdots \\ L^*_{mds} & a^*_{mds} & b^*_{mds} \end{bmatrix}$$

wherein, $L_{mdi}^*$, $a_{mdi}^*$, $b_{mdi}^*$ represent corrected L*a*b* data of the i-th color block in the color target pattern;

before the correction, the target values are used as initial values of correction data, and satisfy the following relations:

$$\begin{cases} L^*_{mdi} = L^*_{cti} \\ a^*_{mdi} = a^*_{cti} \\ b^*_{mdi} = b^*_{cti} \end{cases}, i \in [1, s].$$

4. The method for closed-loop color correction based on a multidimensional table according to claim 1, characterized in that, in step 3, the measurement data is represented in a matrix as follows:

$$CM = \begin{bmatrix} L^*_{cm1} & a^*_{cm1} & b^*_{cm1} \\ L^*_{cm2} & a^*_{cm2} & b^*_{cm2} \\ \vdots & \vdots & \vdots \\ L^*_{cmi} & a^*_{cmi} & b^*_{cmi} \\ \vdots & \vdots & \vdots \\ L^*_{cms} & a^*_{cms} & b^*_{cms} \end{bmatrix}$$

wherein, $L_{cmi}^*$, $a_{cmi}^*$, $b_{cmi}^*$ represent measured L*a*b* data of the i-th colorful block in the color target pattern.

5. The method for closed-loop color correction based on a multidimensional table according to claim 1, characterized in that, in step 4, an equation for calculating a degree of color difference between the measurement data and the target data is as follows:

$$\Delta E = \sqrt{(L_1^* - L_2^*)^2 + (a_1^* - a_2^*)^2 + (b_1^* - b_2^*)^2} \quad \text{Equation 1}$$

wherein, $L_1^*$, $a_1^*$, $b_1^*$ represent chromatic values of a first color to be compared, and $L_2^*$, $a_2^*$, $b_2^*$ represent chromatic values of another color to be compared;

the following correction equations are used to correct the target data according to the values of the chromatic aberration:

$$\begin{cases} L^*_{mdi} = L^*_{mdi} + MDI_L * (L^*_{cti} - L^*_{cmi}) \\ a^*_{mdi} = a^*_{mdi} + MDI_a * (a^*_{cti} - a^*_{cmi}) \\ b^*_{mdi} = b^*_{mdi} + MDI_b * (b^*_{cti} - b^*_{cmi}) \end{cases}, i \in [1, s] \quad \text{Equation 2}$$

wherein, $MDI_L$, $MDI_a$, $MDI_b$ are correction coefficients for colors L*, respectively.

6. The method for closed-loop color correction based on a multidimensional table according to claim 1, characterized in that, in step 6, during the correction, in order to keep the consistency with target colors, points having a rebounded chromatic aberration are not corrected, that is, the correction values are calculated using equation 3:

$$\begin{cases} L^*_{mdi} = L^*_{mdi} \\ a^*_{mdi} = a^*_{mdi} \\ b^*_{mdi} = b^*_{mdi} \end{cases}, i \in [1, s]. \quad \text{Equation 3}$$

7. A system for closed-loop color correction based on a multidimensional table, comprising:

a printer, an optical sensor, and a processor in communication with the printer and the optical sensor, the system being for performing loop color correction for color conversion based on a multidimensional table, wherein the color conversion establishes a mapping relationship between a set of input points and a set of output points using a multidimensional table, the multidimensional table being represented by expressions as follows:

$$In = \begin{bmatrix} InP1_1 & InP2_1 & \ldots & InPi_1 & \ldots & InPn_1 \\ InP1_2 & InP2_2 & \ldots & InPi_2 & \ldots & InPn_2 \\ \vdots & \vdots & \vdots & \vdots & \vdots & \vdots \\ InP1_j & InP2_j & \ldots & InPi_j & \ldots & InPn_j \\ \vdots & \vdots & \vdots & \vdots & \vdots & \vdots \\ InP1_m & InP2_m & \ldots & InPi_m & \ldots & InPn_m \end{bmatrix}$$

$$Out = \begin{bmatrix} OutP1_1 & OutP2_1 & \ldots & OutPi_1 & \ldots & OutPt_1 \\ OutP1_2 & OutP2_2 & \ldots & OutPi_2 & \ldots & OutPt_2 \\ \vdots & \vdots & \vdots & \vdots & \vdots & \vdots \\ OutP1_j & OutP2_j & \ldots & OutPi_j & \ldots & OutPt_j \\ \vdots & \vdots & \vdots & \vdots & \vdots & \vdots \\ OutP1_m & OutP2_m & \ldots & OutPi_m & \ldots & OutPt_m \end{bmatrix}$$

wherein, In represents the input of the multidimensional table, each row of the matrix representing an input point and each column representing a color channel of an input point;

n represents the number of color channels of an input point, indicating that the multidimensional table is a n dimensional look-up table;

m represents the number of input points, indicating the number of nodes in the look-up table;

$Inpi_j$ represents the value of the j-th input point on the i-th color channel;

Out represents the output of the multidimensional table, each row of the matrix representing an output point, and each column representing a color channel of an output point; the j-th row represents output values corresponding to input points represented by the j-th row of In;

t represents the number of color channels of an output point;

$OutPi_j$ represents the value of an output corresponding to the j-th input color point on the i-th channel;

wherein the processor is configured to:

extract sample points to form a color target pattern, the sample points on the color target pattern being used for data collection and calculation;

acquire target chromatic data for using color values in the color target pattern as an input;

retrieve device-independent output data from a target characteristic look-up table as target chromatic data, wherein the target chromatic data uses L*a*b* values specified by the International Commission on illumination;

communicate with the printer to print the color target pattern, then measure color blocks in the color target pattern using a measurement instrument comprising the optical sensor to obtain measurement data, wherein the measurement data is L*a*b* value of each color block;

calculate a degree of color difference between the measurement data and the target data, and correcting the target data according to the degree of color difference;

reproduce the color conversion table by:
using color values on the color target pattern and corresponding correction data to reproduce the target characteristic look-up table, the characteristic look-up table being a multidimensional table and a bidirectional mapping loop-up table; and
converting points in the input matrix In using the device characteristic look-up table, and retrieving points in the corresponding output matrix Out using the target characteristic look-up table; and perform closed-loop correction on the color conversion table, until satisfied or the occurrence of a rebound in average chromatic aberration.

8. The system for closed-loop color correction based on a multidimensional table according to claim 7, characterized in that the color target pattern is composed of color blocks of a series sets of input points, the color blocks represent a combination of different screen dots percentages of each color, colors of the color blocks in the color target pattern being represented as follows:

$$PC = \begin{bmatrix} PcP1_1 & PcP2_1 & \ldots & PcPi_1 & \ldots & PcPn_1 \\ PcP1_2 & PcP2_2 & \ldots & PcPi_2 & \ldots & PcPn_2 \\ \vdots & \vdots & \vdots & \vdots & \vdots & \vdots \\ PcP1_j & PcP2_j & \ldots & PcPi_j & \ldots & PcPn_j \\ \vdots & \vdots & \vdots & \vdots & \vdots & \vdots \\ PcP1_s & PcP2_s & \ldots & PcPi_s & \ldots & PcPn_s \end{bmatrix}$$

wherein, PC represents a set of colors of the color blocks, each row in the matrix representing a color block in the color target pattern and each column representing a color channel of an input point;

s represents the number of color blocks in the color target pattern;

$PcPi_j$ represents a screen dot percentage of the j-th color block on the i-th color channel, each color channel having the same or a different screen dot percentage, $PcPi_j \in [0,100\%]$;

the target data is represented in a dot matrix as follows:

$$CT = \begin{bmatrix} L^*_{ct1} & a^*_{ct1} & b^*_{ct1} \\ L^*_{ct2} & a^*_{ct2} & b^*_{ct2} \\ \vdots & \vdots & \vdots \\ L^*_{cti} & a^*_{cti} & b^*_{cti} \\ \vdots & \vdots & \vdots \\ L^*_{cts} & a^*_{cts} & b^*_{cts} \end{bmatrix}$$

wherein, $L_{cti}^*$, $a_{cti}^*$, $b_{cti}^*$ represent target L*a*b* data of the i-th color block in the color target pattern;

correction data is represented in a matrix as follows:

$$MD = \begin{bmatrix} L^*_{md1} & a^*_{md1} & b^*_{md1} \\ L^*_{md2} & a^*_{md2} & b^*_{md2} \\ \vdots & \vdots & \vdots \\ L^*_{mdi} & a^*_{mdi} & b^*_{mdi} \\ \vdots & \vdots & \vdots \\ L^*_{mds} & a^*_{mds} & b^*_{mds} \end{bmatrix}$$

wherein, $L_{mdi}^*$, $a_{mdi}^*$, $b_{mdi}^*$ represent corrected L*a*b* data of the i-th color block in the color target pattern;

before the correction, the target values are used as initial values of correction data, and satisfy the following relations:

$$\begin{cases} L^*_{mdi} = L^*_{cti} \\ md = a^*_{cti} \\ b^*_{mdi} = b^*_{cti} \end{cases}, i \in [1, s]$$

the measurement data is represented in a matrix as follows:

$$CM = \begin{bmatrix} L^*_{cm1} & a^*_{cm1} & b^*_{cm1} \\ L^*_{cm2} & a^*_{cm2} & b^*_{cm2} \\ \vdots & \vdots & \vdots \\ L^*_{cmi} & a^*_{cmi} & b^*_{cmi} \\ \vdots & \vdots & \vdots \\ L^*_{cms} & a^*_{cms} & b^*_{cms} \end{bmatrix}$$

wherein, $L_{cmi}^*$, $a_{cmi}^*$, $b_{cmi}^*$ represent measured L*a*b* data of the i-th colorful block in the color target pattern;

an equation for calculating a degree of color difference between the measurement data and the target data is as follows:

$$\Delta E = \sqrt{(L_1^* - L_2^*)^2 + (a_1^* - a_2^*)^2 + (b_1^* - b_2^*)^2} \quad \text{Equation 1}$$

wherein, $L_1^*$, $a_1^*$, $b_1^*$ represent chromatic values of a first color to be compared, and $L_2^*$, $a_2^*$, $b_2^*$ represent chromatic values of another color to be compared;

the following correction equations are used to correct the target data according to the values of the chromatic aberration:

$$\begin{cases} L^*_{mdi} = L^*_{mdi} + MDI_L * (L^*_{cti} - L^*_{cmi}) \\ a^*_{mdi} = a^*_{mdi} + MDI_a * (a^*_{cti} - a^*_{cmi}) \\ b^*_{mdi} = b^*_{mdi} + MDI_b * (b^*_{cti} - b^*_{cmi}) \end{cases}, i \in [1, s] \quad \text{Equation 2}$$

wherein, $MDI_L$, $MDI_a$, $MDI_b$ are correction coefficients for colors L*, a*, b*, respectively;

during the correction, in order to keep the consistency with target colors, points having a rebounded chromatic aberration are not corrected, that is, the correction values are calculated using equation 3:

$$\begin{cases} L^*_{mdi} = L^*_{mdi} \\ a^*_{mdi} = a^*_{mdi} \\ b^*_{mdi} = b^*_{mdi} \end{cases}, i \in [1, s]. \quad \text{Equation 3}$$

* * * * *